May 5, 1970 G. A. HOWELLS 3,510,855

MAGNETIC STORAGE DEVICES

Filed Sept. 8, 1967 5 Sheets-Sheet 1

Inventor
GEORGE A. HOWELLS
By Charles L. Johnson
Attorney

May 5, 1970 G. A. HOWELLS 3,510,855

MAGNETIC STORAGE DEVICES

Filed Sept. 8, 1967 5 Sheets-Sheet 2

Inventor
GEORGE A. HOWELLS
By Charles L. Johnson
Attorney

May 5, 1970 G. A. HOWELLS 3,510,855

MAGNETIC STORAGE DEVICES

Filed Sept. 8, 1967 5 Sheets-Sheet 3

Inventor
GEORGE A. HOWELLS
By Charles L. Johnson
Attorney

Inventor
GEORGE A. HOWELLS
By Charles L. Johnson
Attorney

Inventor
GEORGE A. HOWELLS
By Charles L. Johnson
Attorney

United States Patent Office 3,510,855

Patented May 5, 1970

3,510,855

MAGNETIC STORAGE DEVICES

George Aneurin Howells, Bishop's Stortford, England, assignor to International Standard Electric Corporation, New York, N.Y., a corporation of Delaware Filed Sept. 8, 1967, Ser. No. 666,323

Claims priority, application Great Britain, Oct. 11, 1966, 45,384/66

Int. Cl. G11c *11/08, 11/10*

U.S. Cl. 340—174 13 Claims

ABSTRACT OF THE DISCLOSURE

An arrangement of magnetic storage devices including a plate of low reluctance magnetic material has a plurality of equal sized, homogeneous, right quadrilateral prismatic projections, spaced one from another, arranged in columns and rows in a two-dimensioned array. The projections are aligned with their sides parallel to the axes of the columns and rows respectively, the projections in alternate columns alternating with right quadrilateral spaces each of which spaces exceeds in area the area of the base of any adjoining projection. A plane film of anisotropic magnetic material parallel to the plate has a so-called square loop hysteresis characteristic in the direction of the columns and a so-called linear loop characteristic in the direction of the rows upon a rigid film supporting member of nonmagnetic material.

This invention relates to orthogonal arrays or matrices of magnetic storage devices which are provided in part by a sheet or film of magnetic material having a rectangular or "square" hysteresis loop along its so-called "easy" axis and a linear loop along its "hard" axis. The term "square loop material" is used herein to define a magnetic material in which the hysteresis loop has a very steep slope along the unsaturated portion and a negligibly small slope in the saturated regions. The square loop material is associated with a second plate of magnetic material having a low reluctance and shaped so that the two pieces of magnetic material together create an orthogonal array of magnetic circuits partly in the square loop material and partly in the shaped plate.

According to the present invention there is provided an arrangement of magnetic storage devices including a plate of low reluctance magnetic material having a plurality of equal sized, homogeneous, right quadrilateral prismatic projections, spaced one from another, arranged in columns and rows in a two-dimensioned array, the projections being aligned with their sides parallel to the axes of the columns and rows respectively, the projections in alternate columns alternating with right quadrilateral spaces each of which spaces exceeds in area the area of the base of any adjoining projection, a plane film of anisotropic magnetic material parallel to the plate and having a so-called square loop hysteresis characteristic in the direction of the columns and a so-called linear loop characteristic in the direction of the rows, a rigid film supporting member of non-magnetic material. The plane film may be spaced from the tops of the projections to create a plurality of magnetic circuits between the plate and the plane film each of which circuits includes a gap.

Access conductors for the storage devices are laid in pairs connected in parallel, one pair of conductors passing down either side of the projections in a row and another pair of conductors passing down either side of the projections in a column. One pair of conductors is termed the "digit-write" conductors and the other pair the "word" conductors. Bi-directional currents are required in the digit-write conductors, to store a binary "1" or "0" according to the current direction, and uni-directional currents are used in the word conductors at right angles to the digit-write conductors to effect write-in and readout of the stored digits. The read-out signals are induced in the digit-write conductors or in additional read-out conductors parallel to the digit-write conductors when the word conductors are energized.

In order that the above and other features of the invention may be more readily understood embodiments of the invention will now be described with reference to the accompanying drawings, in which:

FIGS. 1*a* and 1*b* illustrate two alternative patterns of projections formed in the plate of low reluctance material;

A complete memory array consists basically of three items, the bottom plate of low reluctance material having the projections or posts, the top film of square loop material and the conductors.

Figures 1A, 1B:
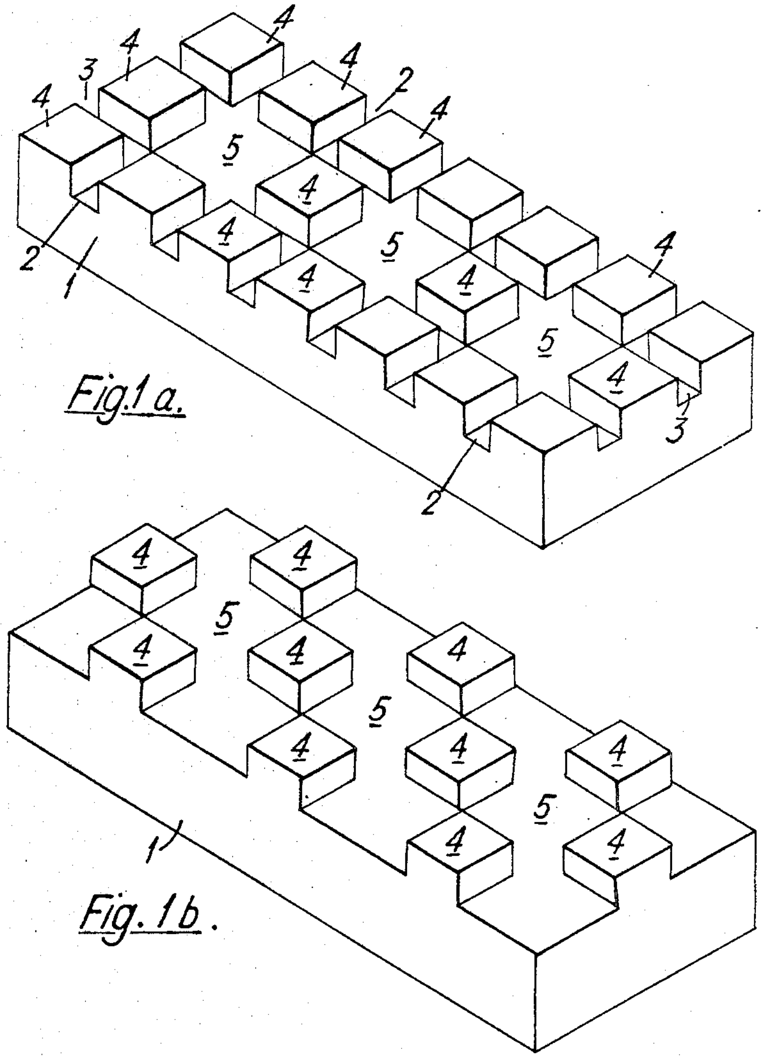

The bottom plate shown in FIG. 1*a* consists of a plate 1 of ferrite material which is polished flat and has an orthogonal pattern of grooves 2 and 3 cut into one face to form an array of square posts 4. Alternate posts in alternate rows are then removed to leave square spaces 5, each of which is larger in area than the base of any adjoining post. Only one such row of posts 4 and spaces 5 is shown in FIG. 1*a* to simplify the drawing.

The pattern illustrated in FIG. 1*a* is the basic pattern required for creating the magnetic storage devices according to the invention. The actual storage is performed in the top plate which is placed over the bottom plate 1 as will be explained below. Each storage area in the top plate is defined in terms of the four posts 4 adjoining each side of a space 5. It may be desirable therefore to remove the four posts 4 adjacent each corner of the spaces 5 as shown in FIG. 1*b*, for example to reduce weight and save material.

Figure 2:
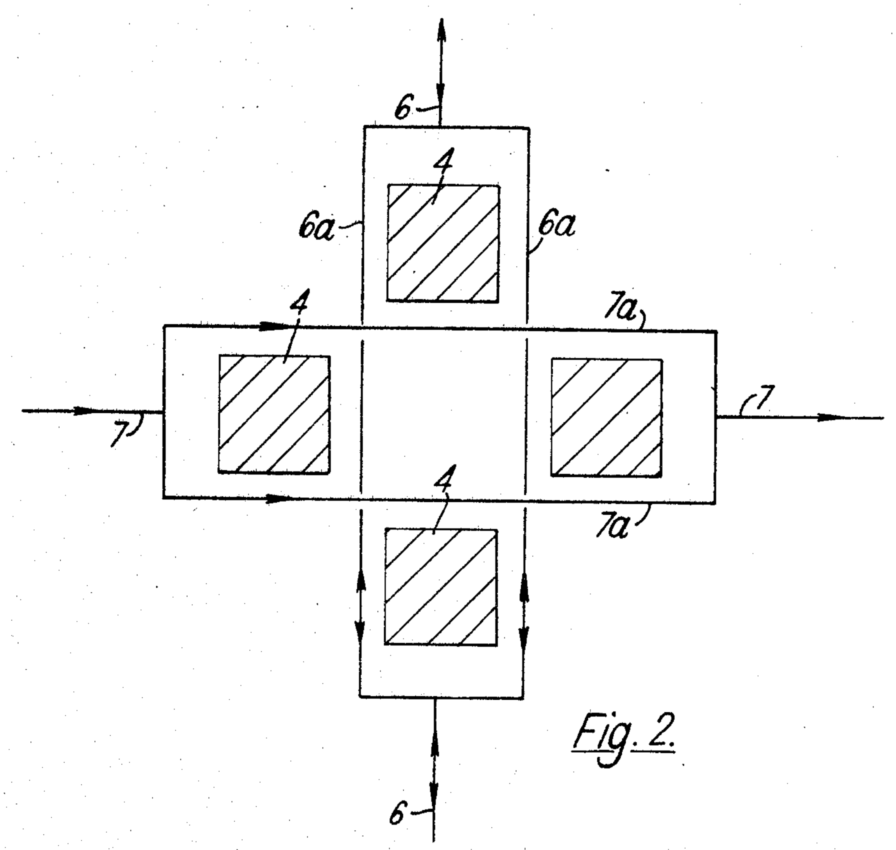
FIG. 2 illustrates the arrangement of digit-write and word conductors for a single storage device.

The next step in constructing the array of storage devices is to lay the digit-write and word conductors in the pattern of posts 4. The conductors for one storage device are illustrated in FIG. 2. The digit conductor 6 is in fact two conductors 6*a* laid one on either side of a pair of posts 4 in a column, and these two conductors are connected in parallel so that when pulsed the current divides equally and half the current flows down each of the conductors 6*a* in the same direction. The word conductor 7 is also made up of two conductors 7*a* on either side of the posts 4 in a row. Again the conductors 7*a* are connected in parallel.

Figure 3:
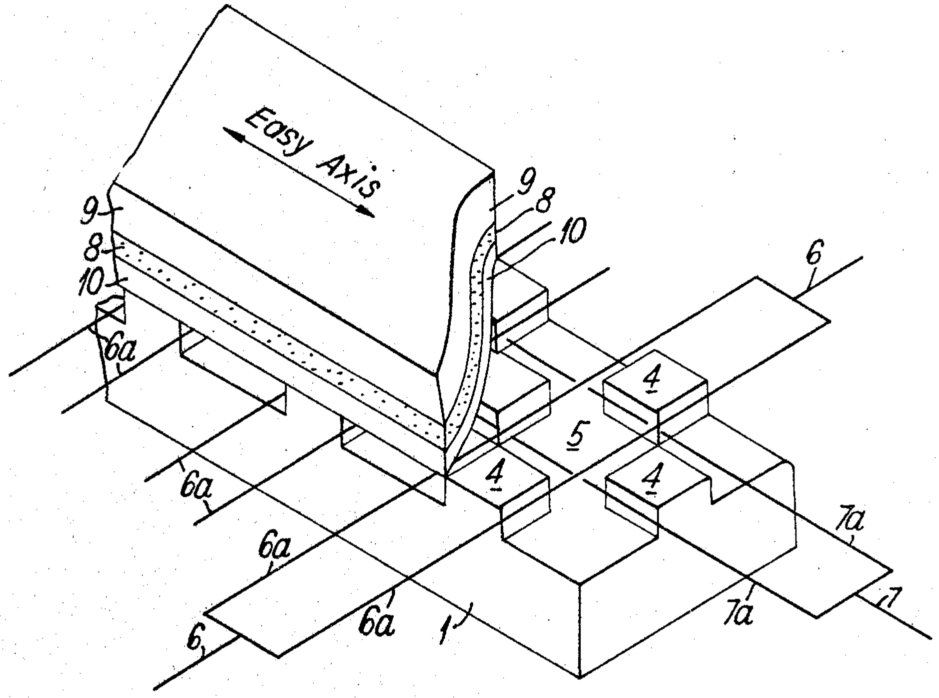
FIG. 3 illustrates a completed array of storage devices.

The top plate or sheet of square loop material, for example, an anisotropic magnetic nickel-iron alloy, is deposited as a thin film 8, FIG. 3, on a glass or metal substrate 9. The composite plate is then placed over the tops of the posts 4 with the film 8 nearest the tops of the posts. In the preferred embodiment the film 8 is spaced from the tops of the posts 4 by a thin layer 10 of nonmagnetic material which creates the equivalent of an air gap in the magnetic circuit. The film 8 is arranged with the easy axis of anisotropy in the direction of the field produced by the digit conductors.

Figure 4:
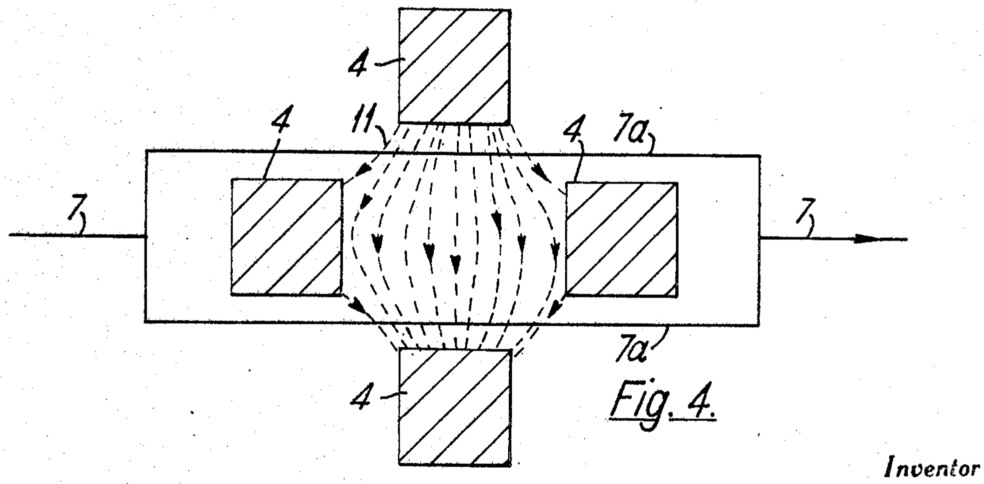
FIG. 4 illustrates the effect of a current in one pair of conductors.

If the effect of a current in one of the double conductors 7*a*, e.g. those making up the word conductor 7, is considered, the resultant field is roughly as indicated in FIG. 4. The field 11 produced in the thin film 8 (not shown) overlying the posts 4 and the conductor 7 is roughly at right angles to direction of the current flow in the conductors 7_a_. The exact configuration of the field 11 is dependent on film thickness, dimensions of posts and spaces, the thickness of the air gap or spaces and on the planar geometry and magnetic properties of the thin film.

If the easy axis of the film is at right angles to the digit-write conductor 6 the direction of remanent magnetization after a writing operation serves as the stored information "1" or "0." The operation of the store will now be considered in greater detail.

Figures 5, 6:
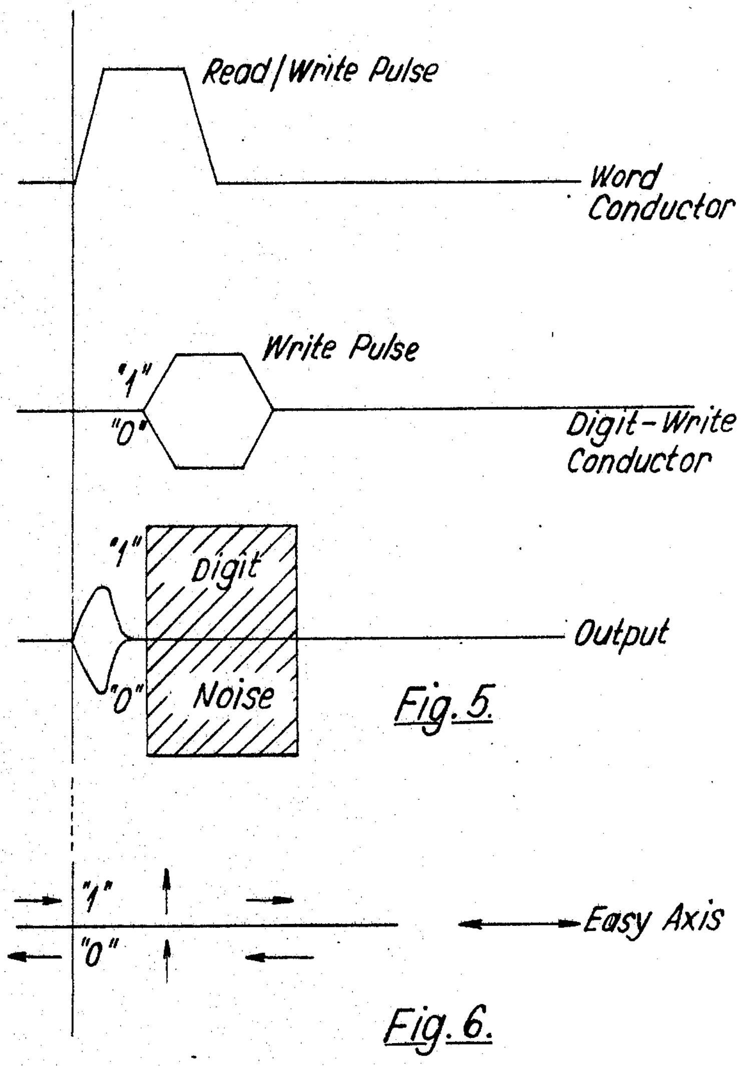
FIG. 5 illustrates the current pulses flowing in the digit-write and word conductors respectively.
FIG. 6 illustrates the switching of the magnetic field in response to the currents in the conductors.

The array of magnetic storage devices which are partly illustrated in FIG. 3 make up a "word-address" store, that is to say the store is addressed a complete word at a time rather than a bit at a time. There are two basic operations, reading and writing. They are considered separately but, as will be seen, they are in fact constantly associated. The common factor is the read/write pulse applied to the word conductor 7, FIG. 3. In considering the effect of the pulses in the conductors 6 and 7 it will be assumed that there is no effective information stored prior to the first pulse on conductor 7. As the front edge of the read/write pulse rises, a field is set up in the anisotropic thin film along the hard axis of the film. Then, during the trailing edge of the read/write pulse a write pulse is applied to the digit-write conductor 6. As the read/write pulse decays the remanent field reverts to lying along the easy axis of the film, but its precise direction along the easy axis depends on the direction of current flow in the digit-write conductor 6. For example, as shown in FIGS. 5 and 6, if the digit-write pulse is positive, then a "1" will be stored at the intersection of that particular conductor 6 and the word conductor 7 which is common to all the bits of that word. In FIG. 6 it will be seen that the remanent magnetization is turned at right angles to the easy axis during the reading front edge of the word pulse and it settles to point towards the right along the easy axis after the positive digit-write pulse ceases. If the digit-write pulse were negative for a "0" then it would settle to point to the left instead.

When the next read/write pulse is applied to conductor 7, the remanent field is turned through 90° during the rising front edge of the pulse and the direction of rotation determines the polarity of the output pulse generated either in the digit-write conductor 6 or in a separate output winding parallel with the conductor 6. The reading operation is destructive and the information must be rewritten on the trailing edge of the read/write pulse if it is to be retained.

If a separate output conductor is used care must be taken to prevent digit noise being accepted as an output after the reading operation when the subsequent writing operation is being performed. If the output is derived via the digit-write conductor 6 it is assumed that adequate gating will be provided to separate the two different functions of the digit-write conductor.

To prevent destructive read-out, the arrangement described above can be modified to trap the flux along the remanent easy axis of the anisotropic film. One way of doing this is to surround the two projections in line along the easy axis with each quadrilateral space with shorted conductors around each projection as shown in FIG. 7_a_.

The projections 4_a_, which are in line with the spaces 5_a_ along the easy axis, each have a shorted turn 11 wound around the projection. When a read/write pulse is applied, in the absence of a digit-write pulse, the effect of the shorted turns 11 is to delay the complete switching of the magnetic field to the direction of the hard axis so that there is a magnetic vector or component remaining in the immediately preceding easy axis direction when the read/write pulse ends. This effect is brought about because as the magnetic material is switched under the influence of the read/write pulse an induced current is set up in the shorted turns 11 and this retards the flux decay along the easy axis through the ferrite. Sufficient easy axis magnetic flux must remain during the decay of the read/write pulse to switch the magnetic material back to its condition preceding the pulse.

Figure 7A:
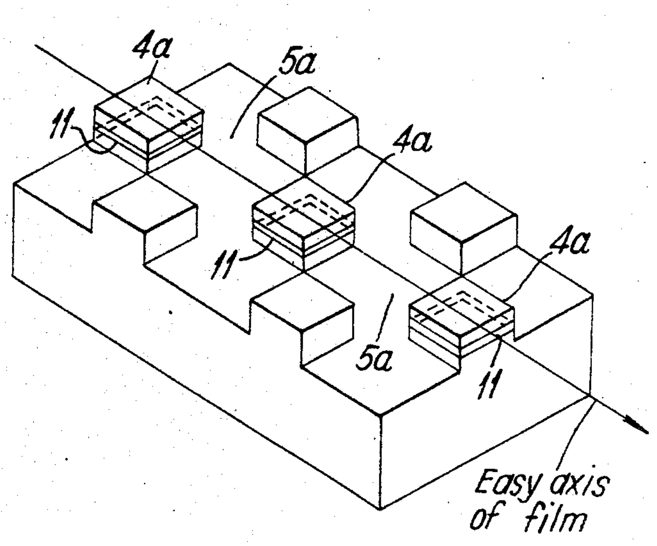
FIGS. 7*a* and 7*b* illustrate two alternative modifications of the arrangement of FIG. 3 for nondestructive read-out of the stored information.
Figure 7B:
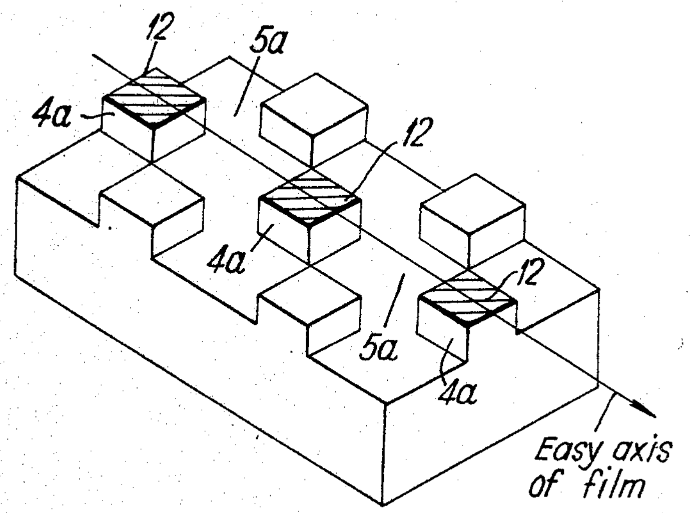

The same result can be achieved by interposing between the top of each projection and the anisotropic film a conducting layer, as shown in FIG. 7_b_. Each of the projections 4_a_ has a separate conducting layer 12 placed on top and this layer 12 acts in exactly the same way as the shorted turn 11 in FIG. 7_a_.

An alternative method of making the array is to lay the conductors in the slots in the ferrite, fill the slots up with a potting compound and re-polish the potted ferrite to produce a flat surface upon which the film of square loop material can be deposited. The partly potted ferrite plate then acts as the substrate for the square loop material.

Yet another method of construction is to deposit the square loop film on a flat substrate, deposit a multilayer pattern of conductors on the first film, then deposit a pattern of ferrite areas which will form the parts and finally deposit a thicker layer of ferrite to form the base plate. This is in fact making the array in a reverse manner to that previously described.

It is to be understood that the foregoing description of specific examples of this invention is made by way of example only and is not to be considered as a limitation on its scope.

I claim:

1. An arrangement of magnetic storage devices including:

a plate of low reluctance magnetic material having a plurality of equal sized, homogenenous, right quadrilateral prismatic projections, spaced one from another, arranged in columns and rows in a two-dimensioned array, the projections being aligned with their sides parallel to the axes of the columns and rows respectively, the projections in alternate columns alternating with right quadrilateral spaces each of which spaces exceeds in area the area of the base of any adjoining projections;

a plane film of anisotropic magnetic material parallel to the plate and having a so-called square loop hysteresis characteristic in the direction of the columns and a so-called linear loop characteristic in the direction of the rows;

a rigid film supporting member of nonmagnetic material;

access conductors for the storage devices laid in the spaces between the projections of each row and each column respectively, the conductors being laid in pairs connected in parallel, one pair of conductors passing down either side of the projections in a row and another pair of conductors passing down either side of the projections in a column, the right quadrilateral space between four projections bounded by one row pair of conductors and one column pair of conductors being surrounded by the magnetic circuit for one storage device;

additional separate pairs of conductors connected in parallel in either the rows of the columns only; and the projections in every column alternate with right quadrilateral spaces each of which spaces exceeds in area the area of the base of any adjoining projection, the projections of adjacent columns being staggered so that the spaces and projections alternate with each other in both rows and columns.

2. An arrangement according to claim 1 in which the plane film spaced from the tops of the projections to create a plurality of magnetic circuits between the plate and the plane film each of which includes a gap.

3. An arrangement according to claim 1 in which the film of anisotropic magnetic material is spaced from the tops of the projections by a film of solid nonmagnetic material.

4. An arrangement according to claim 1 in which the low reluctance material is a ferrite material.

5. An arrangement according to claim 1 in which the anisotropic material is a nickel-iron alloy.

6. An arrangement according to claim 5 in which the anisotropic material is deposited as a thin film on a glass substrate.

7. An arrangement of magnetic storage devices including:

a plate of low reluctance magnetic material having a plurality of equal sized, homogeneous, right quadrilateral prismatic projections, spaced one from another, arranged in columns and rows in a two-dimensional array, the projections being aligned with their sides parallel to the axes of the columns and rows respectively, the projections in alternate columns alternating with right quadrilateral spaces each of which spaces exceeds in area the area of the base of any adjoining projection;

a plane film of anisotropic magnetic parallel to the plate and having a so-called square loop hysteresis characteristic in the direction of the columns and a so-called linear loop characteristic in the direction of the rows;

a rigid film supporting member of nonmagnetic material; and means for trapping remanent flux along the easy axis of the anisotropic film when a magnetic field lying in the easy axis of the film is switched to lie along the hard axis of the film.

8. An arrangement according to claim 7 in which the anisotropic material is a nickel-iron alloy.

9. An arrangement according to claim 8 in which the anistropic material is deposited as a thin film on a glass substrate.

10. An arrangement according to claim 7 in which said trapping means is a shorted conductor around each projection adjacent a quadrilateral space in the direction of the easy axis of the anisotropic film.

11. An arrangement according to claim 10 in which the shorted conductor, the access conductors and the low reluctance material are formed as successive layers or patterns upon a film of anisotropic material.

12. An arrangement according to claim 7 in which the low reluctance material is a ferrite material.

13. An arrangement according to claim 7 in which the trapping means is a conducting layer interposed between the top of each projection adjacent a quadrilateral space in the direction of the easy axis of the anisotropic film.

References Cited

UNITED STATES PATENTS

| | | | |
|---|---|---|---|
| 3,293,623 | 12/1966 | Bobeck | 340—174 |
| 3,401,382 | 9/1968 | Bobeck | 340—174 |

OTHER REFERENCES

IBM Technical Disclosure Bulletin, "Memory Device" by Felten et al., vol. 6, No. 1, June 1963, p. 107.

1963 International Solid-State Circuits Conference, Session I, Digital Memories, "The Waffle Iron Store" by Finch et al., Feb. 20, 1963, pp. 12 and 13.

STANLEY M. URYNOWICZ, Jr., Primary Examiner